(12) United States Patent
Monie et al.

(10) Patent No.: US 6,351,693 B1
(45) Date of Patent: Feb. 26, 2002

(54) COMPUTERIZED SYSTEM FOR CONTROLLING THERMOSTATS

(75) Inventors: Vijaykumar Subramonie Monie, Edina; Richard Daniel Hamann, Bloomington; Stephen Duane Cook, St. Paul, all of MN (US); Premraj K. Mannikkath, Bangalore; Rajesh K. Vasudevan, Cochin, both of (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/235,140

(22) Filed: Jan. 22, 1999

(51) Int. Cl.[7] ............................................... G05D 23/00
(52) U.S. Cl. ........................................ 700/299; 700/17
(58) Field of Search .......................... 700/17, 299, 300; 702/99, 130

(56) References Cited

U.S. PATENT DOCUMENTS

| | | | | |
|---|---|---|---|---|
| 4,843,084 A | * | 6/1989 | Parker et al. ................ | 700/277 |
| 4,884,214 A | * | 11/1989 | Parker et al. ................ | 700/278 |
| 5,181,653 A | * | 1/1993 | Foster et al. ................ | 236/49.3 |
| 5,311,451 A | * | 5/1994 | Barrett ........................ | 700/278 |
| 5,682,949 A | * | 11/1997 | Ratcliffe et al. ............ | 165/209 |
| 5,927,398 A | * | 7/1999 | Maciulewicz ............... | 165/209 |
| 5,934,554 A | * | 8/1999 | Charles et al. ............. | 236/46 R |
| 6,157,943 A | * | 12/2000 | Meyer ........................ | 709/203 |
| 6,192,282 B1 | * | 2/2001 | Smith et al. ................. | 700/19 |
| 6,196,467 B1 | * | 3/2001 | Dushane et al. .......... | 236/46 R |

* cited by examiner

Primary Examiner—William Grant
Assistant Examiner—Zoila Cabrera
(74) Attorney, Agent, or Firm—Schwegman, Lundberg, Woessner & Kluth, P.A.

(57) ABSTRACT

A computerized system is provided that shows a visual representation of thermostat programming information and provides context-sensitive help. The system automatically detects communicating thermostats on a network upon starting, and gives a visual representation of the stages of thermostat programming. The system further provides a visual representation of programming details of a user-selected stage while providing the representation of all stages, and allows selection of stages for display or modification of programming details in any order. The system also provides context-sensitive help for each of the stages and for each of the programming details of each stage when selected, in the form of instruction text and pop-up clarifying text.

18 Claims, 9 Drawing Sheets

COMPUTERIZED SYSTEM FOR CONTROLLING THERMOSTATS

FIELD OF THE INVENTION

The invention relates generally to computerized temperature control, and more generally to computerized remote control of communicating thermostats.

COPYRIGHT NOTICE

Portions of the disclosure of this patent document contain material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings:

Copyright 1999, Honeywell Inc., All Rights Reserved.

BACKGROUND OF THE INVENTION

Managing temperature and other environmental conditions in commercial facilities is a task that is of importance both for the comfort of those using the facility and for the owner of such a facility who wishes to minimize operating cost. A facility's temperature is generally regulated such that the environment is comfortable for customers, or is suitable for whatever other purpose the facility may serve. But, the manager or owner of the facility will seek to minimize the expense of providing such an environment, and so seek to carefully control the way in which heating or air conditioning equipment is used.

Facility equipment operators may not only seek to regulate temperature to a specific and predetermined suitable temperature, but may seek to vary temperature with time of day or week, or to vary parameters other than temperature. For example, a school that is only open between 8:00 a.m. and 4:00 p.m. on weekdays may choose to maintain a comfortable temperature of 68 degrees between 7:00 a.m. and 4:00 p.m., but let the temperature decrease to 60 degrees at other times of day and on weekends.

Furthermore, an owner of a facility that allows indoor parking may seek to not only control the air temperature of the parking area, but to control the level of pollutants such as carbon monoxide in the air by monitoring pollutant levels and running ventilation equipment to remove pollutants when needed.

In some facilities, heating and air conditioning equipment controls may allow customization of more detailed functions of the climate control system, in order to better control the system efficiency. Fans in heating or cooling systems may be programmed to run for a period beyond when the heating or cooling device is active, and may be set to run for specified minimum and maximum times. Activation of these climate control systems may be dependent upon the temperature falling out of a specified range of temperatures, and such activation may be triggered differently by each of a number of thermostats within the facility. Different degrees of control over the climate control system may also be allowed at each thermostat's manual controls, such that those people using a particular area of a facility may only adjust the climate control system within predetermined operational specifications.

But, even setting minor parameters of typical climate control systems such as altering time twice a year for daylight savings time usually requires a professional climate control system worker to visit the facility and program the changed data. Setting multiple thermostats in a facility can require further work, visiting each thermostat in question and making or verifying appropriate settings. The present invention addresses the need for a solution to these and other problems.

SUMMARY OF THE INVENTION

A computerized system is provided that shows a visual representation of thermostat programming information and provides context-sensitive help. The system automatically detects communicating thermostats on a network upon starting, and gives a visual representation of the programming stages available for programming a thermostat. The system further provides a visual representation of programming details of a user-selected programming stage while providing the representation of all programming stages, and allows selection of programming stages for display or modification of programming details in any order. The system also provides context-sensitive help for each of the programming stages and for each of the programming details of each programming stage when selected, in the form of instruction text and pop-up clarifying clauses.

DETAILED DESCRIPTION

In the following detailed description of example embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The invention disclosed herein comprises a computerized system for programming thermostats. The system provides a visual representation of data to be programmed to communicating thermostats over a network, and provides instructions such as context-sensitive help, instruction text and status text as a part of the visual representation. The instructions are provided so that a manual or other instruction for operation of the system is not required.

The system comprises a number of programming stages, each of which has associated programming details and instructions, which can be used to program the thermostats. Each programming stage comprises programming details related to other items in the programming stage, and can be selected in any order. The system provides a visual representation of programming details for a programming stage selected by a user while providing the representation of all programming stages in a separate part of a display. The system also provides context-sensitive help for each of the programming stages and for each of the programming details of each programming stage when selected.

Figure 1:
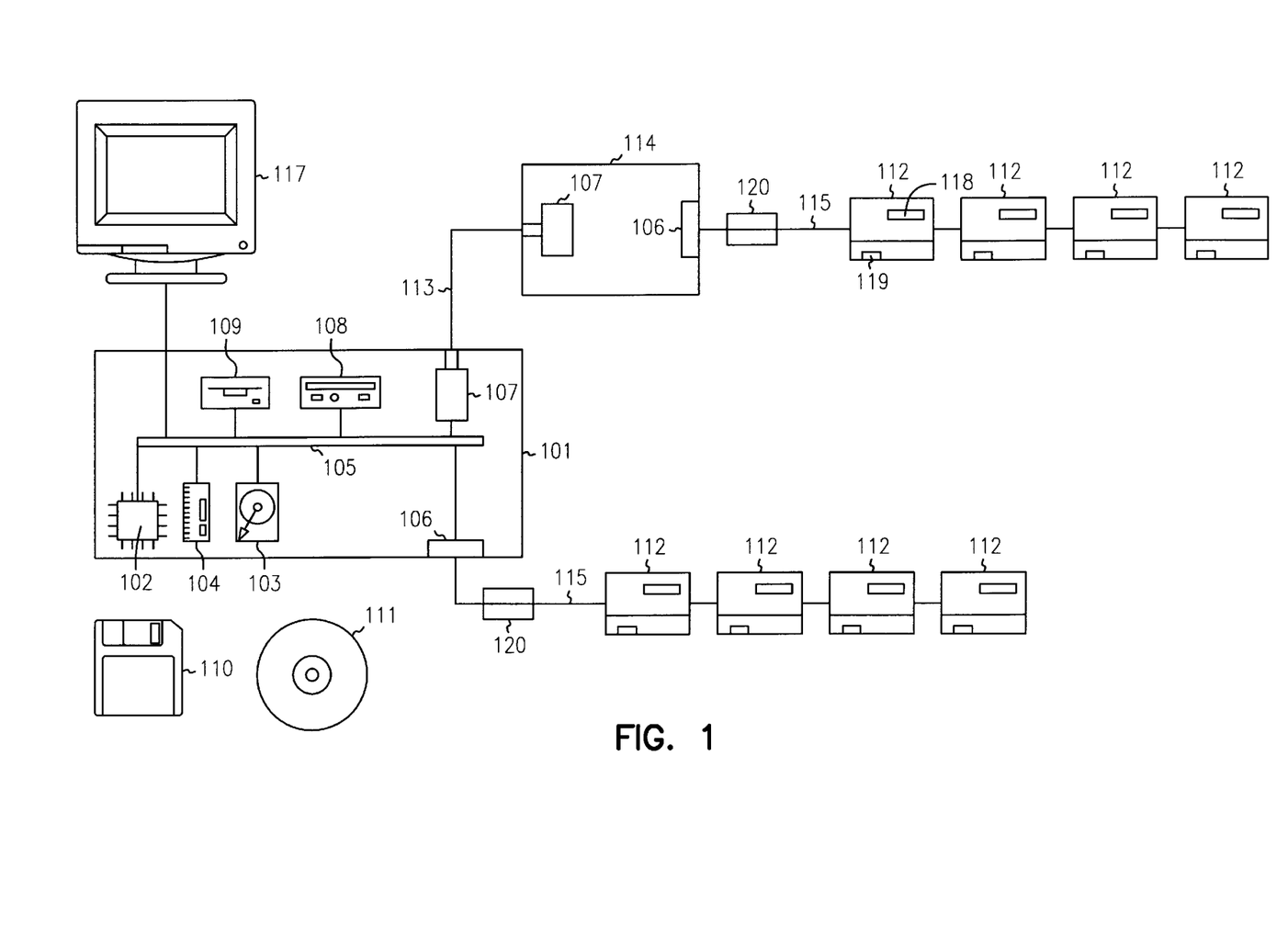
FIG. 1 shows computerized thermostat system hardware, consistent with an embodiment of the present invention.

FIG. 1 illustrates a computer 101, with a processor 102, a hard disk drive 103, memory 104, and a system bus 105. The computer also has a serial port 106 or a modem 107, which can be connected to external devices for communication. The computer further contains at least one device to read a user-insertable machine readable medium such as a diskette drive 108 or CD-ROM (Compact Disc—Read Only Memory) drive 109. The user installs the software containing the instructions that form part of an embodiment of the present invention by placing a machine-readable medium such as a diskette 110 or CD-ROM 111 into the diskette drive 108 or CD-ROM drive 109.

The computer is connected to one or more communicating thermostats 112 via either the serial port 106 or the modem 107. Each of the communicating thermostats 112 has a display 118 and a user input 119, and is capable of communicating with the computer via a network connection.

If the connection to the thermostats is made via modem, a telephone connection 113 is established between the computer 101 and a similar computer 114, which also contains a modem 107 and serial port 106. Also, the communicating modems are attached to computer 114 by a thermostat network adapter 120 and by connection 115. In this configuration, computer 114 is similar to computer 101, but contains executable instructions operable to receive data from the modem 107 and output data from serial port 106, such that the computer 114 comprises a portion of a connection between thermostats 112 and computer 101.

If the connection between computer 101 and the one or more communicating thermostats 112 is made via serial port 106 of computer 101, a thermostat network adapter 120 and connection 116 connect the serial port to the communicating thermostats. Computer 101 is also connected to a display 117, capable of providing a visual representation of information within computer 101. In one embodiment of the present invention, the thermostat network adapter 120 and connection 115 are components of a LonTalk (LonTalk is a Trademark of Echelon Corp) network.

It is specifically contemplated that other embodiments exist and are within the scope of the appended claims, and so are intended to be within the scope of this patent application. For example, the communicating thermostats may communicate via a wireless interface, and need not be connected physically to each other or to a computer.

Figure 2:
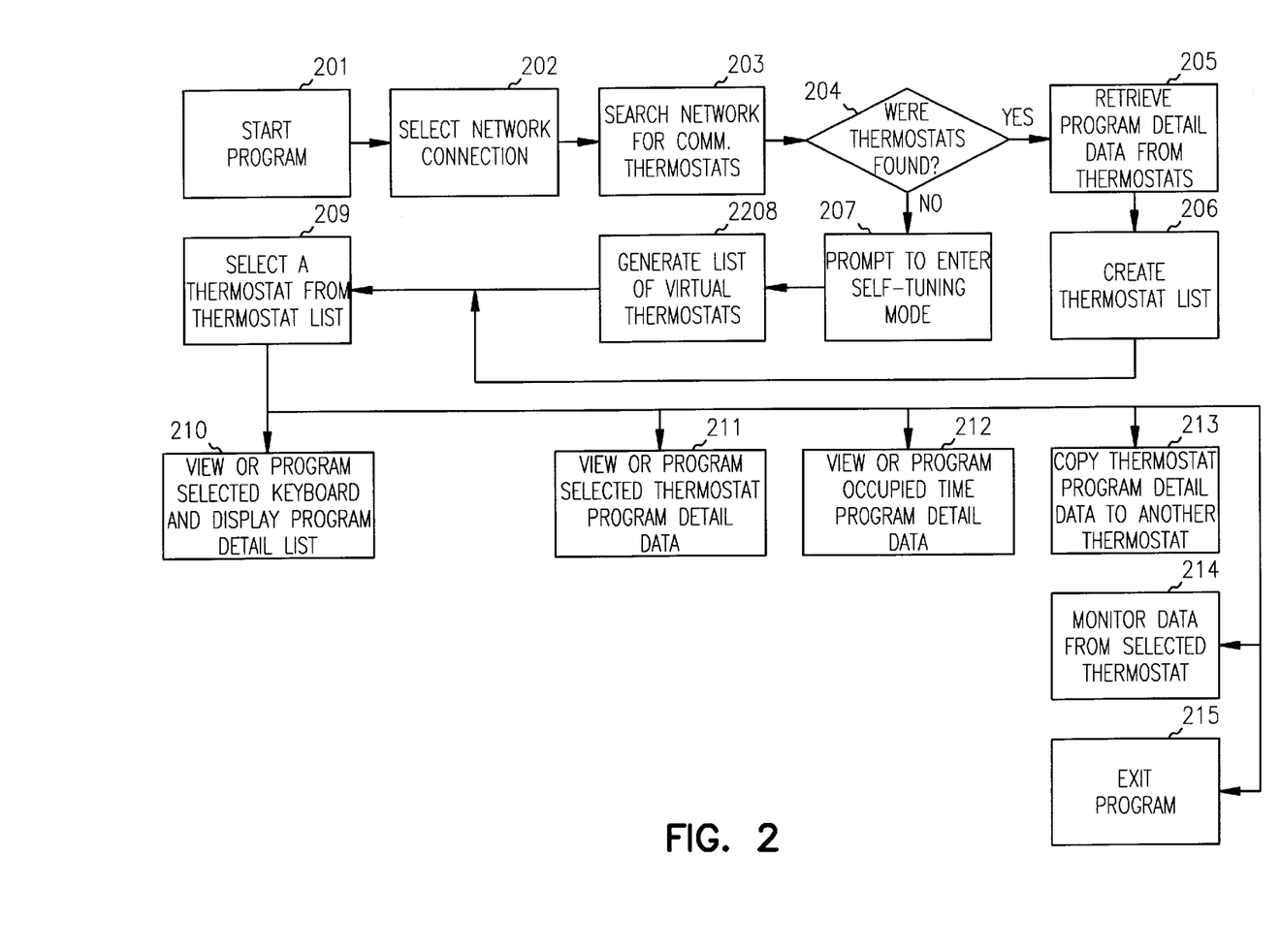
FIG. 2 shows a flowchart of block elements consistent with an embodiment of the present invention.

A block diagram is shown in FIG. 2, which illustrates the elements of an embodiment of the present invention. In this embodiment, the blocks are implemented as software executing on a computer, such that for a period of time when the computer is executing the particular instructions associated with each block, the computer becomes the physical embodiment of that block. The software creates signals within the computer that correspond to the signals and information shared by blocks of FIG. 2, and such signals may be stored as data on the computer as a result of execution of instruction within a block. It is to be understood that all blocks need not coexist, but may exist at separate times as the instructions associated with each block are executed.

At block 201, a user launches the software program that comprises instructions for execution on the computer 101 of FIG. 1. The blocks or programming stages of the executed program provide visual instructions to the user to explain proper operation of the current programming stage or block, and further provide pop-up context-sensitive clarifying text. The user then selects a network connection to the thermostats at block 202, which in one embodiment is a connection via modem 107 or serial port 106 of FIG. 1. The network is then searched for communicating thermostats at block 203, and a determination is made at block 204 as to whether any communicating thermostats were identified. If one or more thermostats were identified, all identified thermostats are queried to send program detail data at block 205 and a thermostat list is compiled at block 206. If no thermostats are identified, the user is then prompted to enter a self-tutoring mode at block 207. The self-tutoring mode provides a user a training function in which the software can be learned or demonstrated, without requiring a network of communicating thermostats to be present. Upon entering the self-tutoring mode, a list of virtual thermostats is generated at block 208. After a thermostat list is compiled at block 206 or a list of virtual thermostats is generated at block 208, the user is prompted to select a thermostat from the thermostat list at block 209.

After a thermostat is selected, the user may select any of the programming stages represented at blocks 210, 211, 212, 213, or 214. More than one programming stage may be selected, and the programming stages may be selected in any order, but are selected one stage at a time. Each programming stage at block 210, 211, 212, 213 and 214 again provides context-sensitive instructions and provides pop-up clarifying text relating to program details within each programming stage, and additionally provides a visual indication of the thermostat currently being viewed or programmed.

At block 210 the user views or programs selected keyboard and display program detail data. This data includes configuring the information displayed by the communicating thermostat on display 118 and configuring the operation of the user input 119 of FIG. 1. Information displayed by the thermostat includes in one embodiment the options of clock format, temperature scale, and whether to display temperature. Operation of the user input similarly includes locking out user programming keys so that a user may not alter selected parts of the thermostat program via the user input.

At block 211 the user views or programs selected thermostat program detail data. This data includes configuring the temperature set points of the thermostat, and selecting thermostat timing configuration options. Temperature set points include data such as heating and cooling temperatures for the thermostat during occupied and unoccupied times and selecting a temperature dead band such that when a measured temperature is within the dead band of the desired temperature the thermostat does not activate associated climate control equipment. Also, thermostat timing configuration options include setting minimum on and off times, as well as configuring how often the thermostat may activate climate control equipment.

At block 212 the user views or programs selected time program detail data, including scheduled occupied and unoccupied times. The thermostat may be programmed to maintain more comfortable temperatures during occupied times, and to expend less energy during unoccupied times, and so vary the temperature of its environment according to the schedule configured here.

At block 213 the user may copy the program detail data configured for one thermostat to one or more other communicating thermostats. This allows a user to configure the program detail data for one thermostat as desired, and copy the data to other thermostats, thereby eliminating the need to configure each individual program detail data element for each thermostat and reducing time and expense in configuring a plurality of similarly programmed thermostats.

At block 214 the user monitors data from the selected thermostat. Data monitored includes the environmental temperature, effective temperature setpoint, and various elements related to the climate control system such as duct temperature, heating or cooling activity, and fan activity. The monitoring programming stage is useful to a user in that it may be viewed to indicate or verify proper programming or operation of a thermostat.

After configuring the thermostats as desired, the user then may exit the program at block 215. The program need not, however, be exited after configuration or at any point to operate properly, and may be left running as long as desired.

One embodiment of the invention is a software application provided by Honeywell Inc.(™), that incorporates LonStat (LonStat, LonTalk and LonWorks are Trademarks of the Echelon Corporation) network components to facilitate communication between the computer and the communicating thermostats. Various screen images created by this application are shown in FIGS. 3, 4, 5, 6, 7, 8 and 9, and are discussed herein in accordance with the invention as described in reference to FIGS. 1 and 2.

Figure 3:
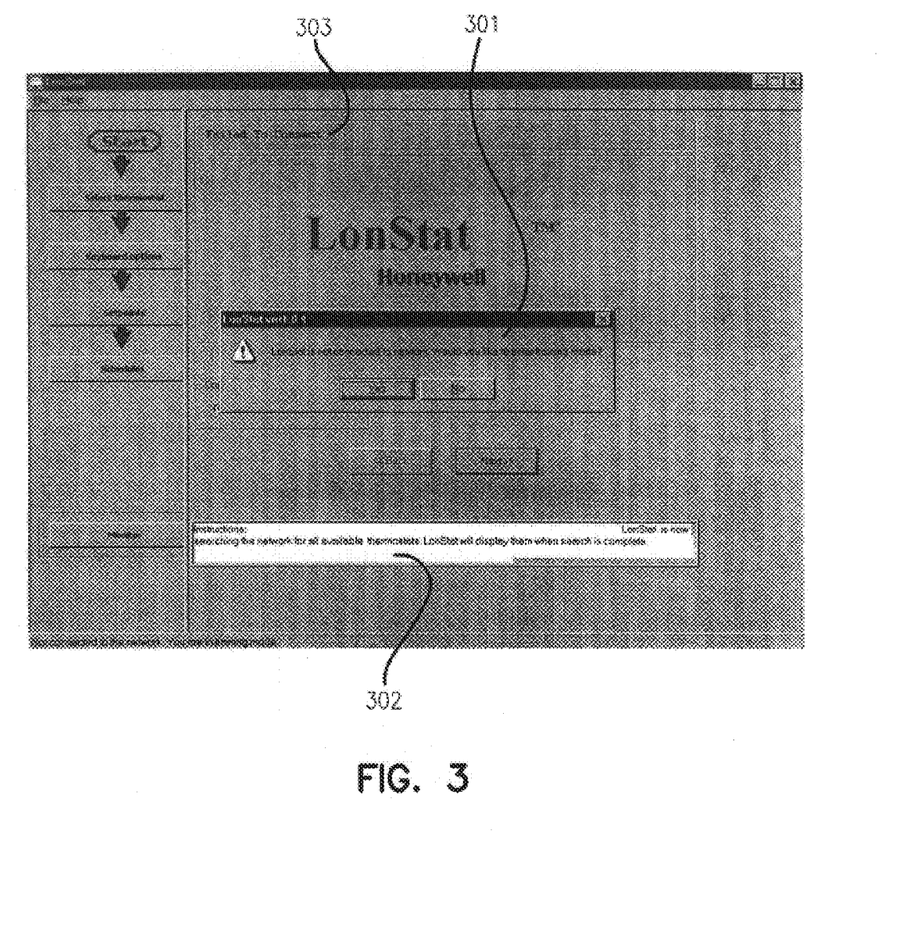
FIG. 3 shows a display image of a software application prompting a user to enter self-tutoring mode, consistent with an embodiment of the present invention.

FIG. 3 shows a screen image of the software application corresponding to block 207 of FIG. 2, wherein the user is prompted to enter a training or self-tutoring mode. The visual prompt to enter self-tutoring mode is shown at 301, where the option "Yes" is selected by default. Instruction text is shown in an instruction text area 302, to provide the user with a visual aid in the correct operation of the current program block or programming stage. Status text is shown at 303, indicating to the user the current state or result of selected software operations. Here, the displayed message "Failed To Connect" indicates the path selected at block 204—that no communicating thermostats were identified after searching the network.

Figure 4:
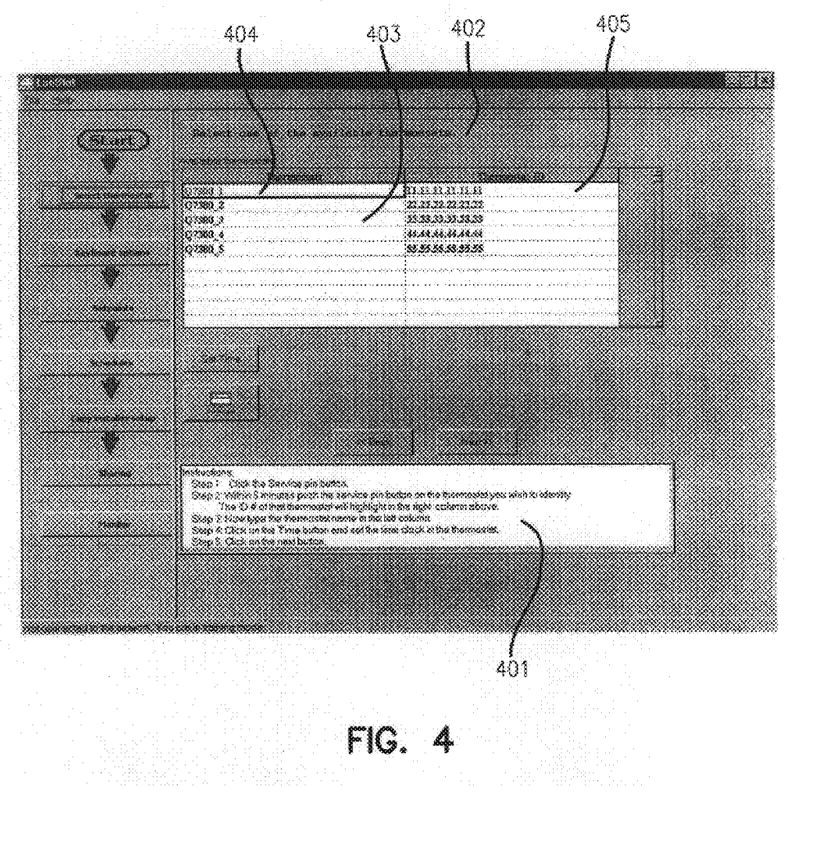
FIG. 4 shows a display image of a software application in which a thermostat is to be selected from a thermostat list, consistent with an embodiment of the present invention.

FIG. 4 depicts a screen image corresponding to block 209 of FIG. 2, in which a thermostat is to be selected from the virtual thermostat list created in self-tutoring mode. Instructions for completing the task presented on this screen are shown in the instruction text area at 401, and the status text at 402 indicates that the user is currently requested to select one of the available thermostats from the thermostat list 403. The selected thermostat is indicated at 404 by a bold outline of the user-configurable thermostat label, which is associated with the thermostat's non-changeable thermostat ID also shown in the thermostat list at 405.

Figure 5:
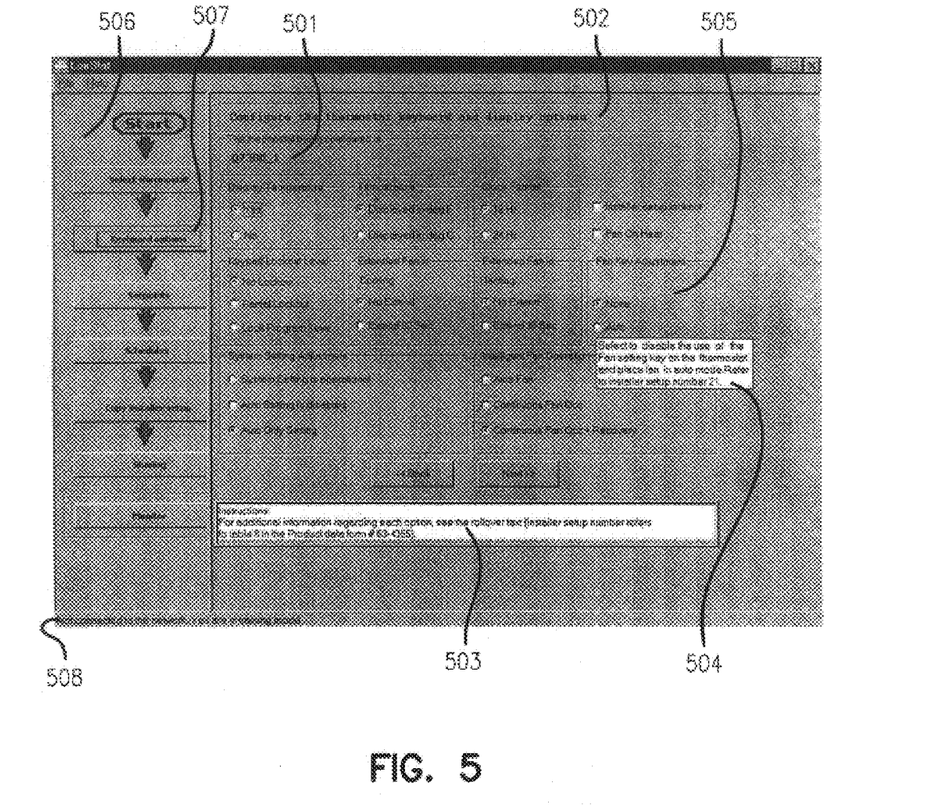
FIG. 5 shows a display image of a software application in which selected keyboard and display program detail items are viewed or programmed, consistent with an embodiment of the present invention.

FIG. 5 illustrates a display screen corresponding to block 210 of FIG. 2, where the user views or programs selected keyboard and display program detail data. The status area at 502 explains the nature of the operations to be performed at the currently selected block, and instruction text is shown at 503 to aid the user in completing the operations. An example of pop-up clarifying text is also shown at 504, which displays text explaining the function of the Fan Key Adjustment setting shown at 505.

FIG. 5 also illustrates the user-configurable thermostat label of the thermostat that has been selected and is being configured or viewed at 501. This thermostat label is viewable in all blocks in which a single thermostat is being viewed or programmed, and is noted here as an example. Also, all blocks show a visual representation of the various programming stages of programming a thermostat, as shown at 506. The current programming stage is indicated by a box drawn around the text representing the selected stage, as indicated at 507. Also, a status area that displays text indicating the current status of the software program exists in all programming stage displays, an example of which is shown at 508.

Figure 6:
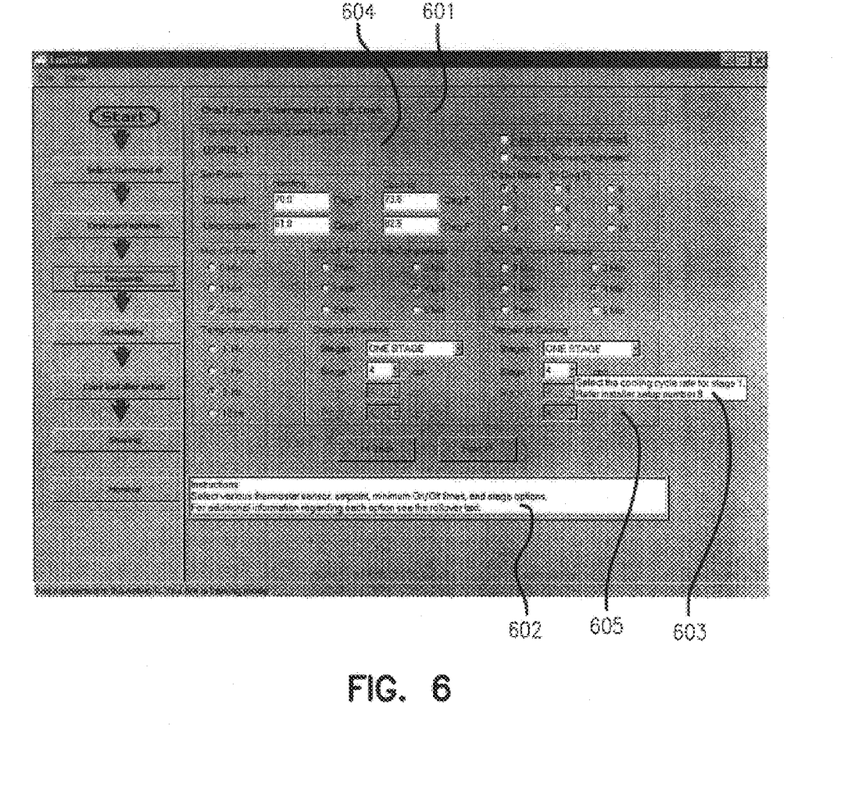
FIG. 6 shows a display image of a software application in which selected thermostat program detail data items are viewed or programmed, consistent with an embodiment of the present invention.

FIG. 6 shows a screen image generated at block 211, at which the user views or programs selected thermostat program detail data. Here, the status text at 601 indicates the current status of the program, and instructions are displayed in the instruction area at 602. Another example of pop-up clarifying text is shown at 603, which displays additional information related to the "Stages of Cooling" program detail data represented at 605. The thermostat currently being configured is also again shown at 604.

Figure 7:
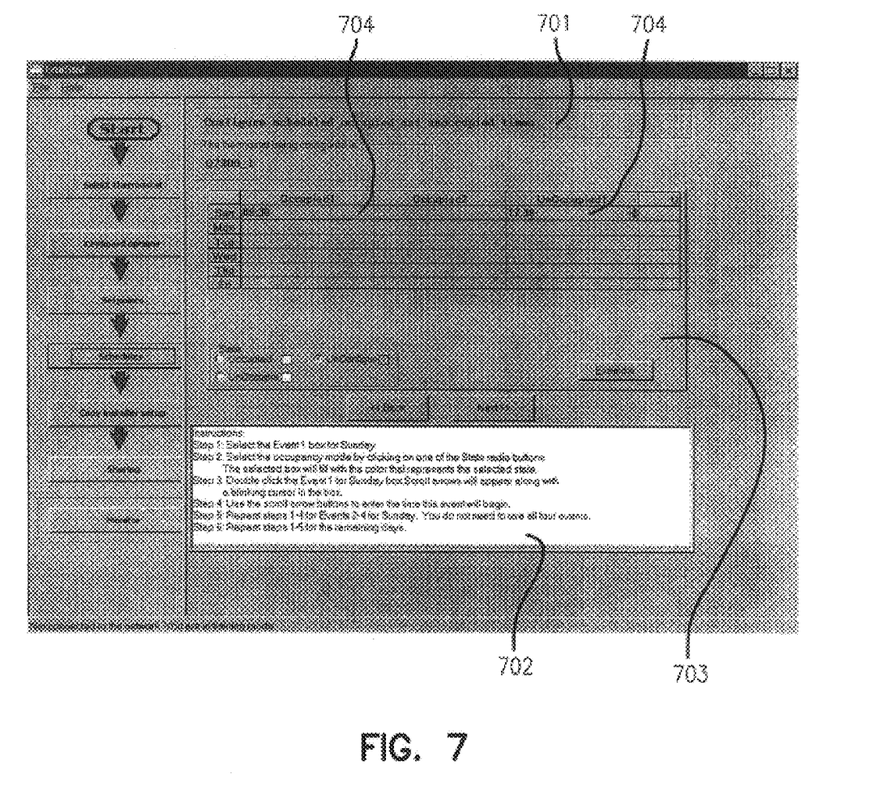
FIG. 7 shows a display image of a software application in which occupied and unoccupied time schedule data items are viewed or programmed, consistent with an embodiment of the present invention.

FIG. 7 shows a display image representing block 212 of FIG. 2, at which the user views or programs program detail data relating to an occupied and unoccupied time schedule. The status area indicates that the user is configuring scheduled occupied and unoccupied times at 701, and instructional help text is provided in the instruction area at 702. A grid calendar is displayed at 703, within which a user may select a day and a status of either occupied or unoccupied by selecting an appropriate block from the grid, and then may enter a time. A selected time of 6:30 A.M. on Sunday as a time of occupation is therefore indicated at 704. Similarly, programming an unoccupied time of 5:30 P.M. is represented at 704, where the time is shown in 24-hour format. In a further embodiment, grid blocks representing unconfigured, occupied and unoccupied status information are distinguished by differently and distinctly colored backgrounds corresponding to such status information.

Figure 8:
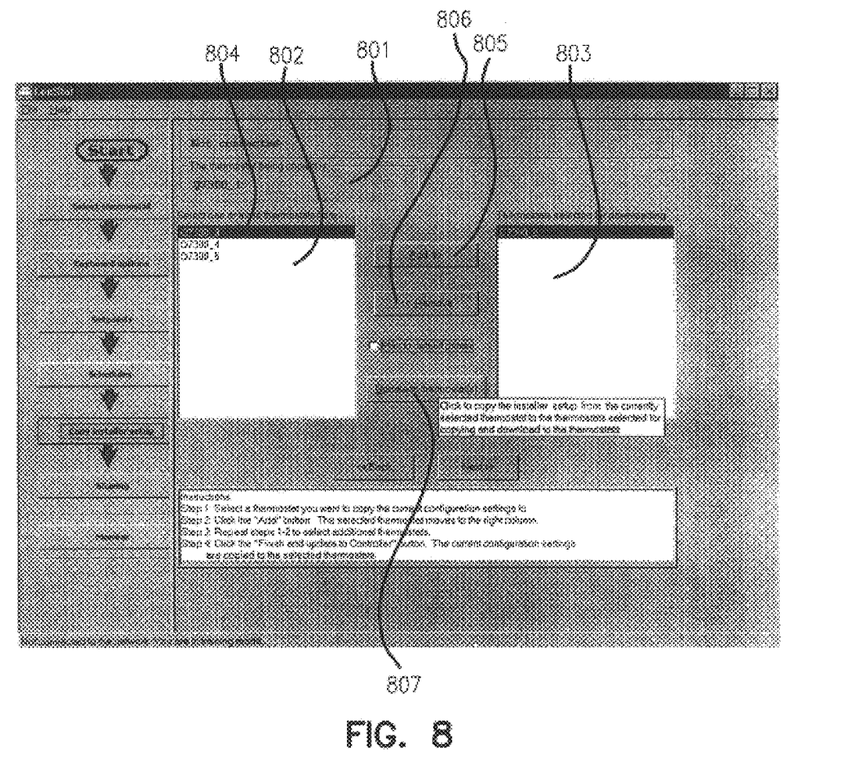
FIG. 8 shows a display image of a software application in which program detail data from a selected thermostat may be downloaded to selected target thermostats, consistent with an embodiment of the present invention.

FIG. 8 shows a display image representing block 213 of FIG. 2, where program detail data from the selected thermostat may be downloaded to other thermostats. The user-configurable thermostat label of the selected thermostat is again displayed at 801, which at this block is the thermostat that will be used to provide the program detail data to be copied to other thermostats. The thermostat list is shown at 802, excluding the selected thermostat. The user selects a target thermostat, indicated at 804 with a dark background to indicate the target thermostat selected, and clicks the "Add" button represented at 805 to add the thermostat label to the download thermostat list of thermostats selected as target thermostats for downloading shown at 803. Similarly, the "Remove" button at 806 may be used to remove selected target thermostats from the download thermostat list at 803. When the target thermostats have been selected, the user selects the "Update to thermostat(s)" button at 807, and the program detail data from the selected thermostat is copied to the selected target thermostats.

Figure 9:
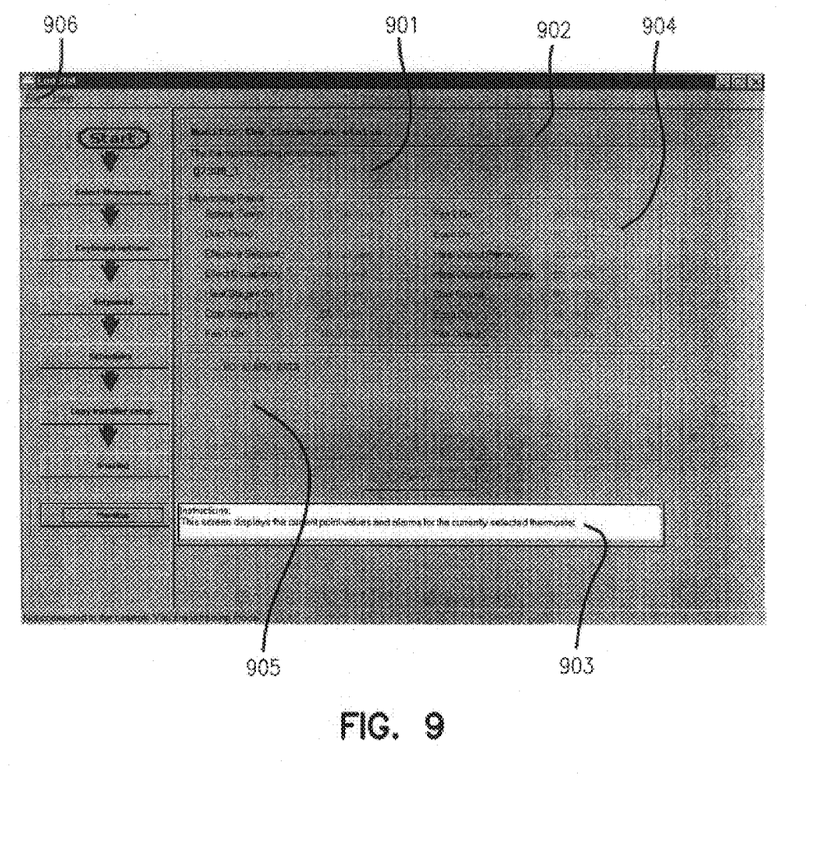
FIG. 9 shows a display image of a software application in which data monitored from a selected thermostat is displayed, consistent with an embodiment of the present invention.

FIG. 9 shows a display image representing block 214 of FIG. 2, in which a user monitors data from the selected thermostat. The selected thermostat is indicated at 901, and the status text at 902 and instruction text at 903 again provide status and information text indicating that status of the selected thermostat is displayed. Details displayed at 904 include environmental temperature, effective temperature setpoint, and various elements related to the climate control system such as duct temperature, heating or cooling activity, and fan activity. Also, alarm data details for the selected thermostat are displayed, at 905.

Finally, to exit the program consistent with block 215 of FIG. 2, the user selects the "File" text displayed at 906, and proceeds to select "Exit" text from a displayed menu.

The invention described herein provides a number of benefits to the user. The ability to communicate with and configure thermostats remotely saves the expense of on-site visits by climate control professionals, and the information, pop-up clarifying text, selected thermostat text, programming stage display, and other displayed information lead a user through the thermostat programming process, reducing the need for training or documentation.

Although specific embodiments have been illustrated and described herein, it will be appreciated by those of ordinary skill in the art that any arrangement which is designed to achieve the same purpose may be substituted for the specific embodiments shown. This application is intended to cover any adaptations or variations of the invention. It is intended that this invention be limited only by the claims, and the full scope of equivalents thereof.

We claim:

1. A computerized system, comprising:
    a module within a computer that is operable to give a visual representation of programming stages of programming one of one or more selected communicating thermostats connected to the computer via a network, to retrieve programming details of programming stage details from the one or more communicating thermostats, to give a visual representation of programming details of a stage selected from said programming stages, and to automatically provide instruction that relates to said selected stage, and further operable to allow selection of any one of the communicating thermostats for viewing retrieved programming details or programming said details of a selected programming stage, wherein the stages may be selected viewed or programmed in any order.

2. The computerized system of claim 1, wherein the module, upon starting, searches the network for communicating thermostats, automatically generates a thermostat list of all communicating thermostats found as a result of the search, and retrieves the programming details from the communicating thermostats.

3. The computerized system of claim 2, wherein the module, upon not finding any communicating thermostats connected to the network, automatically enters a self-tutoring mode that provides virtual thermostats that can be selected, viewed, and programmed.

4. The computerized system of claim 1, wherein the selection of any one of the communicating thermostats is performed by selecting a user-configurable thermostat label from a thermostat list of communicating thermostats.

5. The computerized system of claim 1, wherein the stages of programming a thermostat include:
    selecting a thermostat for programming;
    configuring thermostat keyboard and display options;
    configuring thermostat operation time and temperature set point options; and
    configuring scheduled occupied and unoccupied times;
    where the stages may be viewed or programmed in any order.

6. The computerized system of claim 5, further including a stage providing a visual representation of data monitored from a selected communicating thermostat.

7. The computerized system of claim 1, wherein the instruction that relates to the selected stage comprises an instruction window that automatically displays instructions related to programming the current stage, and further comprise clarifying text displayed in pop-up form when a mouse pointer is positioned over a visual representation of a stage or a selected stage programming detail.

8. The computerized system of claim 1, wherein the network comprises a modem connection.

9. A method of programming selected ones of a plurality of thermostat programs, comprising:
    searching a network for communicating thermostats;
    creating a thermostat list of all communicating thermostats found by searching the network;
    selecting a communicating thermostat from the thermostat list to view programming details retrieved from the selected thermostat or to program from the list of communicating thermostats;
    providing a visual representation of programming stages of thermostat programming;
    selecting any stage from such visual representation of stages, wherein a visual representation of stage programming details of the selected stage is then displayed; and
    displaying automatically instructions associated with such selected stage or stage programming details.

10. The method of claim 9, wherein automatically displaying instructions comprises displaying instructions related to programming the current stage programming details, and further comprises displaying pop-up clarifying text when a mouse pointer is positioned over a visual representation of a stage or a selected stage programming detail.

11. The method of claim 9, further comprising:
    retrieving programming details from each communicating thermostat connected to the network such that the retrieved programming details are displayed as part of the visual representation of the stage programming details for the selected stage.

12. The method of claim 9, further comprising:
    entering a self-tutoring mode that provides virtual thermostats that can be selected, viewed, and programmed if no communicating thermostats are found in searching the network for communicating thermostats.

13. The method of claim 9, wherein selecting a communicating thermostat from the thermostat list further comprises selecting the thermostat by selecting a user-configurable thermostat label from the thermostat list.

14. The method of claim 9, wherein the stages of programming a thermostat include:
    selecting a thermostat for programming;

configuring thermostat keyboard and display options;

configuring thermostat operation time and temperature set point options; and configuring scheduled occupied and unoccupied times; where the stages may be viewed or programmed in any order.

15. The method of claim 14, further comprising a stage providing a visual representation of data monitored from a selected communicating thermostat.

16. A machine-readable medium with instructions stored thereon, the instructions operable to cause a computer to:

search a network for communicating thermostats;

create a thermostat list of all communicating thermostats found by searching the network;

allow a user to select a communicating thermostat from the thermostat list to view programming details retrieved from the selected thermostat or to program from the list of communicating thermostats;

provide a visual representation of programming stages of thermostat programming;

allow a user to select any stage from such visual representation of programming stages, wherein a visual representation of stage programming details of the selected stage is displayed upon selection; and display automatically instructions associated with such selected stage or stage programming details.

17. The machine-readable medium of claim 16, wherein the instructions are further operable to cause a computer to retrieve programming details from each communicating thermostat connected to the network such that the retrieved programming details are displayed as part of the visual representation of the stage programming details for the selected stage.

18. The machine readable medium of claim 16, wherein the stages comprise:

selecting a thermostat for programming;

configuring thermostat keyboard and display options;

configuring thermostat operation time and temperature set point options; and configuring scheduled occupied and unoccupied times.

* * * * *